(12) United States Patent
Kammerer

(10) Patent No.: US 6,795,388 B1
(45) Date of Patent: Sep. 21, 2004

(54) RECORDING OR REPRODUCTION APPARATUS WITH A LOADING AND REMOVING DEVICE FOR DISC-TYPE RECORDING MEDIA

(75) Inventor: Manfred Kammerer, St. Georgen (DE)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/868,717

(22) PCT Filed: Dec. 10, 1999

(86) PCT No.: PCT/EP99/09764

§ 371 (c)(1),
(2), (4) Date: Jun. 20, 2001

(87) PCT Pub. No.: WO00/38185

PCT Pub. Date: Jun. 29, 2000

(30) Foreign Application Priority Data

Dec. 22, 1998 (DE) ........................ 198 59 357

(51) Int. Cl.$^7$ ............................................. G11B 17/028
(52) U.S. Cl. ..................................................... 369/270
(58) Field of Search ................................ 369/271, 263, 369/264, 270, 265

(56) References Cited

U.S. PATENT DOCUMENTS

| 3,622,419 | A | | 11/1971 | London et al. ............... 438/64 |
| 4,022,478 | A | | 5/1977 | Stewart ....................... 274/10 |
| 4,286,789 | A | | 9/1981 | Watanabe ................... 369/244 |
| 4,388,128 | A | | 6/1983 | Ogawa et al. ................ 156/64 |
| 4,705,279 | A | * | 11/1987 | Mizukami et al. ......... 279/2.02 |
| 4,958,839 | A | * | 9/1990 | Guzik et al. ............... 279/2.14 |
| 5,555,233 | A | * | 9/1996 | Yano et al. ................. 369/270 |
| 5,600,625 | A | * | 2/1997 | Kammerer ................. 369/270 |
| 5,748,575 | A | | 5/1998 | Lee ............................. 369/30 |
| 5,761,186 | A | * | 6/1998 | Mushika et al. ............ 369/271 |
| 5,774,445 | A | | 6/1998 | Sawi et al. ................. 369/270 |
| 5,796,709 | A | * | 8/1998 | Ootsuka ..................... 369/271 |
| 6,038,206 | A | * | 3/2000 | Mukawa ..................... 369/271 |
| 6,041,033 | A | * | 3/2000 | Otsubo et al. ............. 369/271 |
| 6,061,215 | A | * | 5/2000 | Tomita ....................... 360/133 |
| 6,115,210 | A | * | 9/2000 | Kakuta et al. ........... 360/98.01 |
| 6,163,520 | A | * | 12/2000 | Kobayashi et al. ......... 369/271 |
| 6,252,843 | B1 | * | 6/2001 | Begley et al. .............. 369/271 |

FOREIGN PATENT DOCUMENTS

| EP | 0553034 | 7/1993 | ........... G11B/19/20 |
| EP | 0594128 | 4/1994 | ......... G11B/17/028 |
| EP | 0662723 | 7/1995 | |
| FR | 2078456 | 11/1971 | ............ G11B/3/00 |
| FR | 2443116 | 6/1980 | .......... G11B/17/00 |
| JP | 60 000413 | 5/1985 | |
| WO | 96/23594 | 8/1996 | ........... B05C/11/08 |

* cited by examiner

Primary Examiner—Brian E. Miller
(74) Attorney, Agent, or Firm—Joseph S. Tripoli; Paul P. Kiel

(57) ABSTRACT

The invention relates to a recording or reproduction apparatus with a holding and removing device for disc-type recording media which facilitates the emplacement and removal of the recording medium. According to the invention, the holding and removing device is formed by a cover of the hub of the disc turntable, by means of which, during the emplacement or removal of the recording medium, the holding force with which a recording medium is held on the disc turntable is reduced. The loading on the recording medium during emplacement or removal is thereby advantageously reduced and the special configuration of the cover as restoring means has the result that no additional individual parts are necessary. In an advantageous manner, the recording medium is both held and centered on the disc turntable with a force which is greater than a resistance encountered by the recording medium during emplacement or removal. The field of application of the invention extends to recording or reproduction apparatuses with a holding and removing device—provided on the disc turntable—for the disc-type recording media, such as, for example, CD, CD-ROM or DVD drives.

9 Claims, 4 Drawing Sheets

RECORDING OR REPRODUCTION APPARATUS WITH A LOADING AND REMOVING DEVICE FOR DISC-TYPE RECORDING MEDIA

CROSS REFERENCE TO RELATED APPLICATIONS

This application claims the benefit of German application No. 19859357.0 filed Dec. 22, 1998, which is hereby incorporated herein by reference, and which claims the benefit under 35 U.S.C. § 365 of International Application PCT/EP99/09764, filed Dec. 10, 1999, which was published in accordance with PCT Article 21(2) on Apr. 6, 2000 in English.

BACKGROUND OF THE INVENTION

1. Field of the Invention

The invention relates to a recording or reproduction apparatus with a holding and removing device for disc-type recording medium which retains or releases the recording medium with means provided on the disc turntable.

2. Related Art

Disc turntables with a hub penetrating through a centring hole in the recording medium in recording or reproduction apparatuses which have means for retaining the recording medium on the disc turntable have been known for a long time. Thus, as early as in DE-U 7005274, a mount for records was proposed, which holds a record both radially outwardly and downwardly on the disc turntable. Corresponding embodiments of the known mount for records are illustrated in FIGS. 1 to 4. Individual spring elements are arranged at the periphery of the hub of the disc turntable, the record being pressed onto the disc turntable in the centering hole by the said spring elements. Balls are provided as spring elements, which balls partly project through openings at the periphery of the hub and, at the inwardly projecting part, bear resiliently on a rubber body. What is disadvantageous is that a force required to overcome the spring resistance has the same magnitude in both directions, that is to say during emplacement and removal of the recording medium, and different spring forces are generated by a rubber body on account of fatigue phenomena and environmental influences.

Rising rotational speeds at which the recording medium rotates during recording or reproduction necessitate a larger holding force, which then leads to is advantageous flexural loading on the recording medium during the emplacement or removal of the recording medium.

As an alternative, in the case of a disc turntable composed of plastic capable of being injection-moulded, tongue-shaped springs are provided in radial slots at the periphery of the hub, the undercut limb end of which springs projects radially above the periphery of the hub and is at a distance from the disc turntable corresponding to the thickness of the record. During the emplacement of the record, the tongue-shaped springs spring back and then settle on the record. The recording medium can be removed only by applying a force perpendicularly to the direction of movement of the disc turntable, thereby rendering interchangeability of the recording medium more difficult. Tolerances of the centering hole of the recording medium are not compensated for by the mount.

BRIEF SUMMARY OF THE INVENTION

The object of the invention is to provide a recording or reproduction apparatus with a holding and removing device for disc-type recording media which enables the recording medium to be emplaced and removed with forces that are to be applied exclusively in the directions of movement, compensates for tolerances of the centering hole of the recording medium, applies a constant holding force even over a relatively long period of time, and has a small number of individual parts.

This object is achieved by means which are specified in independent claims; advantageous designs and developments are specified in dependent claims.

It is an aspect of the invention that despite a comparatively small force during the emplacement and removal of the recording medium, the recording medium is held on the disc turntable with a large force and, to that end, a device is specified which comprises a small number of individual parts.

According to the invention, a holding and removing device for disc-type recording media is formed by a cover which closes off the pot-shaped hub of the disc turntable and is provided for the purpose of reducing the force with which the recording medium is held on the disc turntable. For this purpose, the cover has a restoring means which is provided on its edge and is provided for the purpose of withdrawing means that hold the recording medium on the disc turntable. The restoring means comprises a collar which is provided on the edge of the cover and is arranged in a manner such that it engages over the means provided for holding the recording medium on the disc turntable. Pressing the cover in a direction which is directed at the disc turntable has the result that the means holding the recording medium on the disc turntable are guided back and, in an advantageous manner, a force which is necessary to overcome the holding force of the recording medium during emplacement or removal is thereby reduced.

The means that hold the recording medium on the disc turntable are preferably balls or lugs which are arranged in a spring-elastic manner with a spring toothed disc in the pot-shaped hub of the disc turntable and by which the recording medium is held and centered on the disc turntable.

The cover that forms the holding and removing device is preferably guided on an inner hub of the pot-shaped hub of the disc turntable and is guided back into its starting position after actuation with a force that is likewise applied by the spring toothed disc. Since the cover is actuated in the direction of the disc turntable, during the emplacement or removal of the recording medium it is not necessary additionally to apply a force directed perpendicularly to the direction of movement of the recording medium, whereby the removal of the recording medium from the disc turntable is signficantly facilitated compared with known designs.

Tolerances of the centering hole of the recording medium are compensated for by the holding means formed by balls or lugs and, by virtue of the particular configuration of the cover that closes off the pot-shaped hub of the disc turntable, no additional individual parts are necessary in comparison with disc turntables having the same structure.

The holding and removing device comprises a small number of individual parts, enables the emplacement and removal of the recording medium with a force that is directed in the direction of movement of the recording medium, and, with a spring toothed disc preferably produced from phosphor-bronze or spring strip steel, ensures a constant holding force even over a relatively long period of time.

The recording medium can be held on the disc turntable with a large force and disadvantageous bending of the recording medium during emplacement or removal is avoided in an advantageous manner by the holding force being reduced.

In a recording or reproduction apparatus with a holding and removing device for disc-type recording media which retains or releases the recording medium with means provided on the disc turntable, the disc turntable then comprises, in accordance with a first embodiment, a pot-shaped hub which is designed integrally with a surface that forms a bearing surface for the recording medium, balls which hold the recording medium and are arranged in a spring-elastic manner in the pot-shaped hub with a spring toothed disc, the spring toothed disc and a cover which is advantageously used as a holding and removing device.

The number of individual parts required may be reduced further, in accordance with a second embodiment, if pot-type springs are used for holding the recording medium. The cover forming the holding and removing device preferably has latching webs with which it is anchored laterally in the pot-shaped hub. After the cover has been mounted, it latches into lateral recesses in the pot-shaped hub, which limit a movement of the cover directed away from the disc turntable yet nonetheless enable a movement of the cover directed towards the disc turntable. As a result of the movement or pressing of the cover in the direction of the disc turntable, the means holding the recording medium, with a restoring means that is provided on the edge of the cover and is provided in a manner such that it engages over the holding means, are guided back in the direction towards the center of the disc turntable and, as a result, the recording medium is released or it can be emplaced without resistance.

BRIEF DESCRIPTION OF THE DRAWINGS

The invention is explained in more detail below with reference to drawings.

In the figures.

Reference symbols for essentially identical elements are used consistently in the figures.

DETAILED DESCRIPTION OF THE INVENTION

Figure 1:
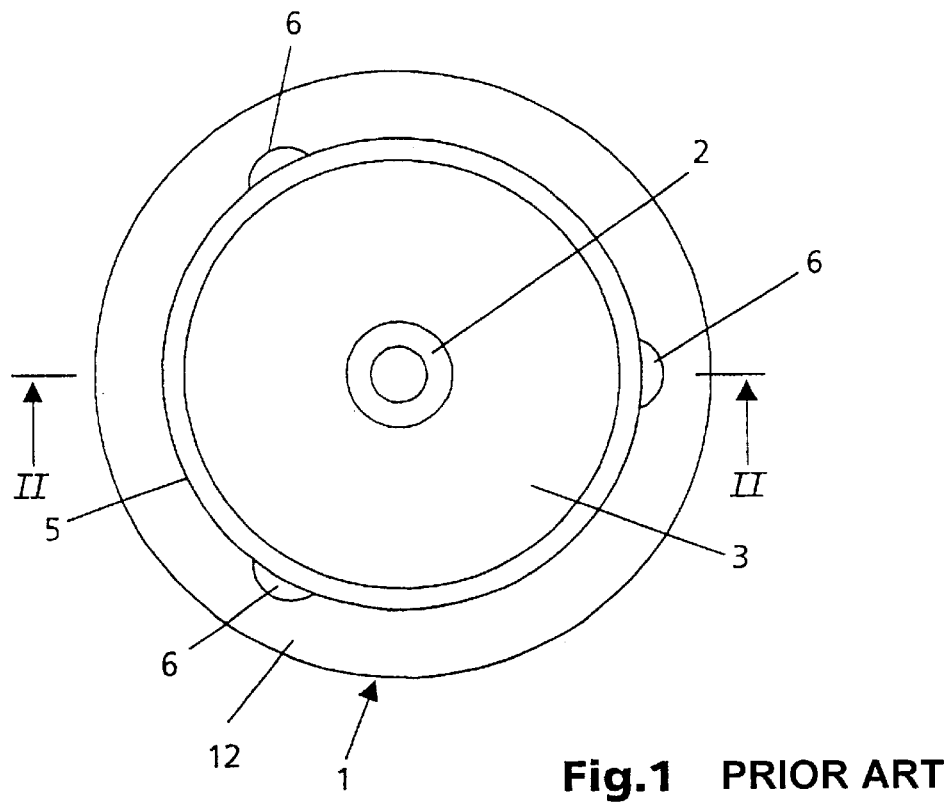
FIG. 1: shows a schematic sketch of a first embodiment of a known mount in plan view.
Figure 2:
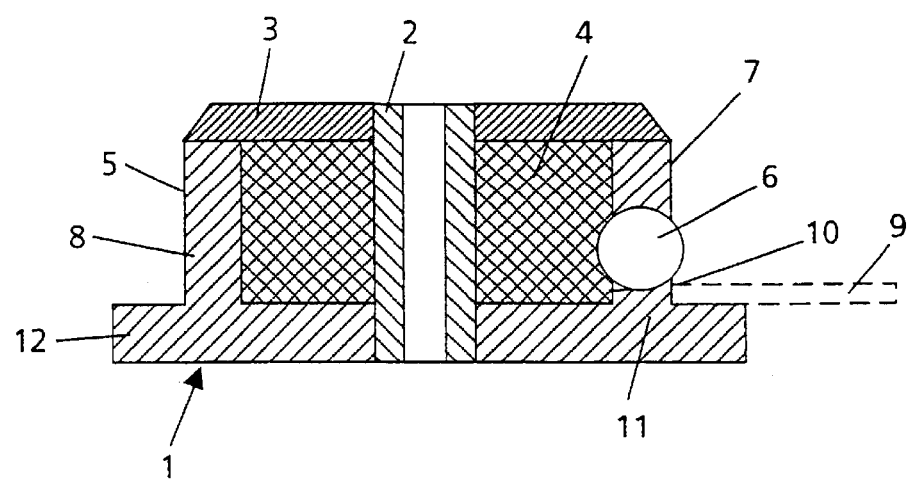
FIG. 2: shows a schematic sketch of the first, known embodiment in section on line II—II in FIG. 1, FIG. 3: shows a schematic sketch of a second embodiment of a known mount in plan view.

In a known recording or reproduction apparatus with a mount for disc-type recording media, which mount retains the recording medium with means provided on the disc turntable, a disc turntable corresponding to FIGS. 1 and 2 comprises a pot-shaped body 1, which is pushed onto a bush 2 and is closed off with a disc 3. A spring-elastic body 4 made of rubber or material having the same effect is inserted in the interior of the pot-shaped body 1 and, at the periphery 5 of the pot-shaped body 1, balls 6 are mounted in openings 7 in the wall 8 of the pot-shaped body 1 with an angular spacing of 120 degrees in each case. The openings 7 in the wall 8 are configured conically in such a way that the balls 6 cannot drop out. The balls 6 project beyond the wall 8 both inwardly and outwardly, and are pressed outwards by the spring force of the rubber body 4. During the emplacement of the recording medium 9, which is indicated by dashes, it is necessary to overcome the resistance of the balls 6 which is formed by the rubber body 4. After the recording medium 9 has passed, the balls 6 settle resiliently on the upper edge 10 of the inner centring hole 11 in the recording medium 9. The recording medium 9 is retained by the balls 6 on the plate 12 of the disc turntable. What is disadvantageous is that the force required to overcome the spring resistance formed by the rubber body 4 has the same magnitude in both directions and is equal to the force with which the recording medium 9 is held and centered on the disc turntable. If the holding force is increased, in order to hold and to center the recording medium reliably on the disc turntable for example also during recording or scanning at an increased rotational speed, the force which is necessary for the emplacement and removal of the recording medium 9 and is necessary for overcoming the force generated by the holding means also inevitably increases. During emplacement and removal, the recording medium 9 is disadvantageously bent if it is gripped on its outer edge in the customary manner.

Figure 3:
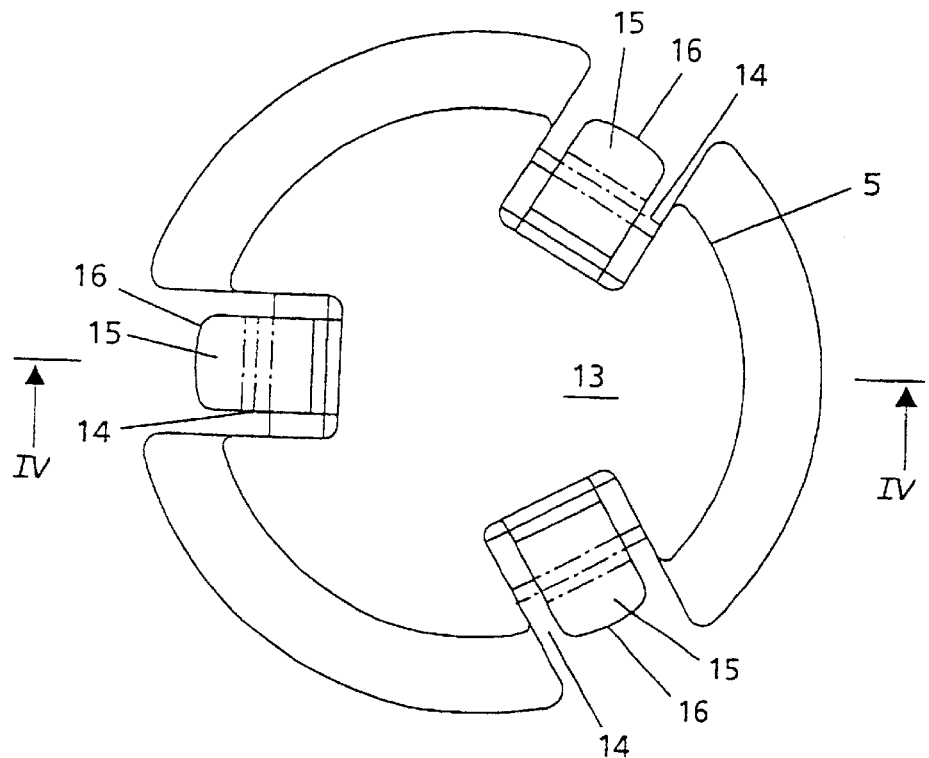
Figure 4:
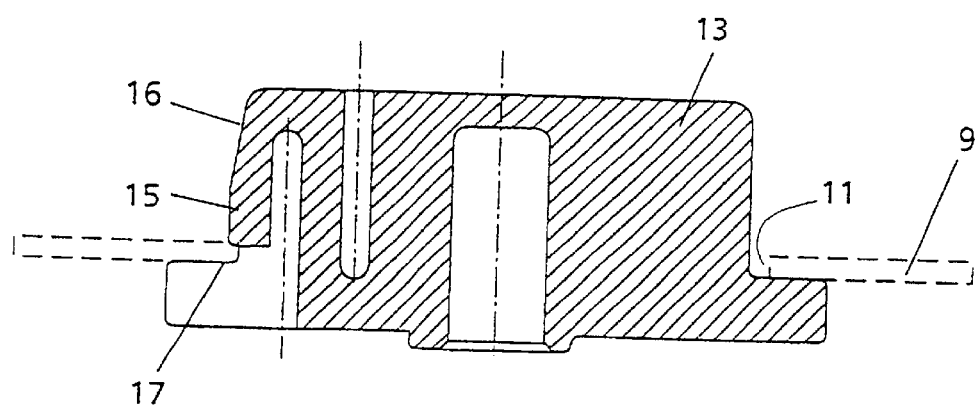
FIG. 4: shows a schematic sketch of the second, known embodiment in section on line IV—IV in FIG. 3, FIG. 5: shows a schematic sketch of a first embodiment according to the invention in section on line I—I in FIG. 6, FIG. 6: shows a schematic sketch of the said first embodiment according to the invention in plan view.

The second, known embodiment according to FIGS. 3 and 4 comprises a plastic injection-moulded body 13 with slots 14, which are likewise arranged with an angular spacing of 120 degrees in each case at the periphery 5 and each contain a tongue-shaped spring 15 injection-moulded onto the body 13 of the disc turntable. The tongue-shaped springs 15 project freely downwards in the direction of the disc turntable and are slightly bevelled on their upper rear part 16. The distance 17 between the tongue-shaped springs 15 and the bearing surface of the disc turntable for the recording medium 9 corresponds approximately to the thickness of the recording medium 9. During the emplacement of the recording medium 9, the tongue-shaped springs 15 first of all spring back and then settle on the recording medium 9 across the recording medium 9.

The recording medium 9 thereby latches fixedly in place on the disc turntable. In order to remove the recording medium 9 from the disc turntable it is then necessary first of all to apply a force directed perpendicularly to the direction of movement. The removal of the recording medium 9 from the disc turntable is thereby disadvantageously rendered more difficult. Tolerances of the centring hole 11 in the recording medium 9 are not compensated for by the mount.

These known embodiments can be differentiated according to the structure as disc turntable with pot-shaped hub and disc turntable with compact hub.

In order to avoid the disadvantages of the known embodiments, a recording or reproduction apparatus with a holding and removing device for disc-type recording media 9 is proposed which is advantageously formed by a cover D which closes off the pot-shaped hub of the disc turntable.

The holding and removing device or the cover D—configured in a particular manner—of the pot-shaped hub of the disc turntable is provided for the purpose of reducing the force with which the recording medium 9 is held on the disc turntable, in order to reduce the loading on the recording medium 9 which occurs during the emplacement and/or removal of the recording medium 9. For this purpose, the cover D has a restoring means R which is provided on its edge and is provided for the withdrawal of means that hold the recording medium 9 on the plate 12 of the disc turntable. The restoring means R comprises a collar which is provided on the edge of the cover D and is arranged in a manner such that it engages over the means provided for holding the recording medium 9 on the disc turntable. The pressing of the cover D in a direction directed at the disc turntable has the result that the means holding the recording medium 9 on the disc turntable are guided back and, in an advantageous manner, a force which is necessary for overcoming the holding force of the recording medium 9 during emplacement or removal is thereby reduced.

The means that hold the recording medium 9 on the disc turntable are, by way of example, balls 6 or lugs 29 which are arranged in a spring-elastic manner with a spring toothed disc 18 in the pot-shaped hub of the disc turntable and by means of which the recording medium 9 is held and centered on the disc turntable. A spring toothed disc 18 produced from phosphor-bronze or spring strip steel, for example, forms, in conjunction with balls 6 or lugs 29 provided on pot-type springs 19, a spring element which ensures a constant holding force even over a relatively long period of time.

The fundamental construction of a cover D which is advantageously used as a holding and removing device is, however, independent of the embodiment of the holding means. It is preferably guided on an inner hub of the pot-shaped hub of the disc turntable, is guided back into its starting position after actuation with a force that is likewise applied by the holding means, and is provided with latching webs 27, with which it is anchored laterally in the pot-shaped hub in such a way that its movement directed away from the disc turntable is limited and a movement in the direction of the disc turntable is made possible.

Figure 5:
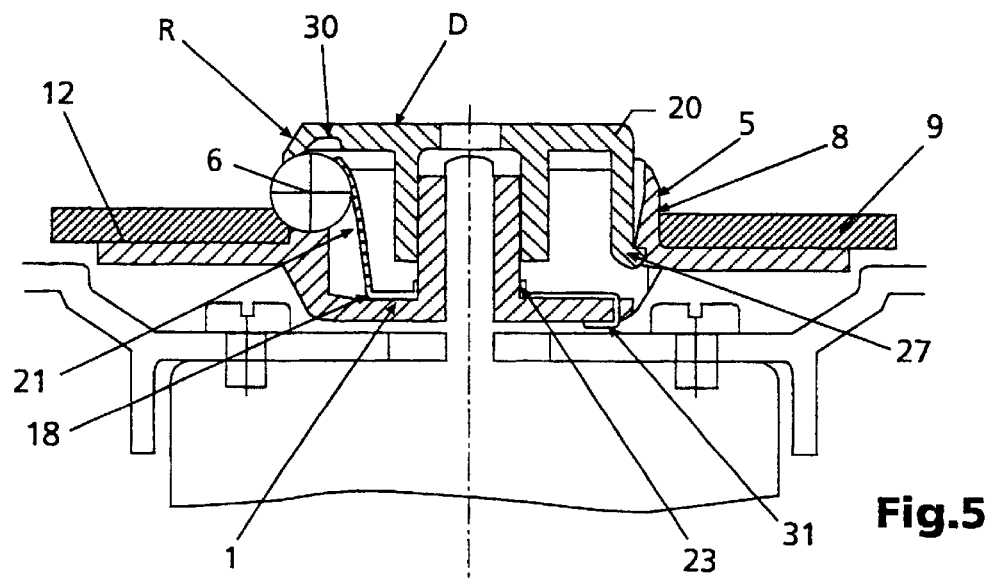
Figure 6:
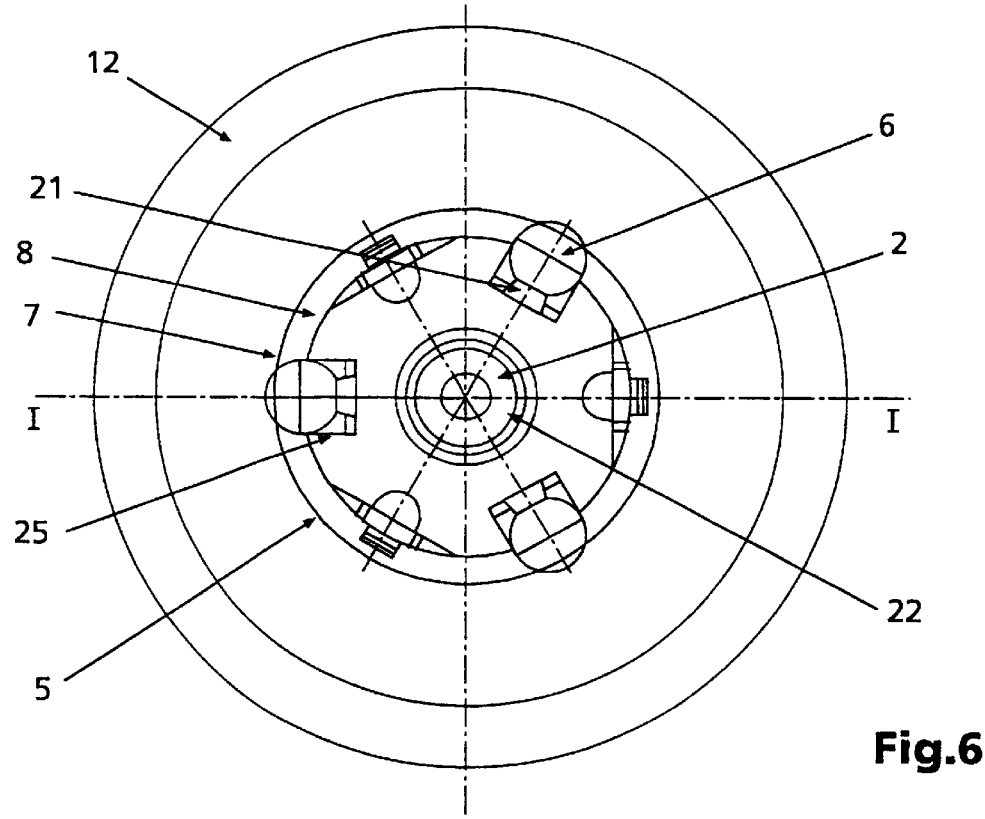

In accordance with a first embodiment according to the invention which is illustrated in FIGS. 5 and 6, the holding means provided are balls 6 by means of which the recording medium 9 is held and centered on the disc turntable.

In accordance with FIG. 5, a pot-shaped body 1, which, with an inner hub, forms a bush 2, is closed off with a latching disc 2 forming the cover D. At the periphery 5 of the pot-shaped body 1, balls 6 are mounted in openings 7 in the wall 8 of the pot-shaped body 1 with an angular spacing of 120 degrees in each case, and the openings 7 in the wall 8 are configured conically in such a way that the balls 6 cannot drop out. A spring toothed disc 18 is arranged in the interior of the pot-shaped body 1 and, in this embodiment, forms a spring element in conjunction with balls 6. The balls 6 project beyond the wall 8 both inwardly and outwardly and are pressed outwards by the spring force of the spring toothed disc 18. For this purpose, the spring toothed disc 18 arranged in the pot-shaped hub of the disc turntable has teeth 21, which are arranged preferably at an angle other than 90 degrees with respect to the base area of the spring toothed disc 18 or a plane formed by the plate 12 of the disc turntable.

The internal diameter 22, identified in FIG. 6, of the spring toothed disc 18, illustrated in FIG. 5, is matched to the external diameter of the inner hub of the pot-shaped body 1 and carries a collar 23, by means of which the spring toothed disc 18 is guided on the inner hub, in order to prevent the spring toothed disc 18 from tilting or canting. The teeth 21 of the spring toothed disc 18 are rounded at their ends and their width is narrower than pockets in which the balls 6 are arranged. The pockets are formed by holding lugs 25 proceeding from the openings 7 in the wall 8 of the pot-shaped body 1. They are opened slightly during the mounting of the balls 6 and hold the balls 6 in an advantageous manner during the mounting of the spring toothed disc 18, the teeth 21 of which likewise engage in these pockets. The spring toothed disc 18 is thereby oriented in a manner secure against rotation in the pot-shaped body 1 and ensures, in conjunction with a fastening web 31, which is provided on the spring toothed disc 18 and is fixedly anchored in the bottom of the pot-shaped body 1, that a spring force is exerted on the balls 6 by the spring toothed disc 18. In principle, however, it is also possible to use an arrangement—which is specified in the following embodiment—for holding the spring toothed disc 18 at the bottom of the pot-shaped hub which does not require fastening of the spring toothed disc 18 at the bottom of the pot-shaped hub.

The latching disc 20 forming the cover D of the pot-shaped hub is oriented on the inner hub of the pot-shaped body 1 and is provided with latching webs 27, which engage in lateral projections in the pot-shaped body 1. As a result of this, movement of the cover D in the direction of the disc turntable is enabled and movement directed away from the disc turntable is limited.

The arrangement has a small number of structural parts and requires a low outlay on assembly.

Plastic capable of being injection-moulded is preferably used as the material for producing the pot-shaped body 1 and the latching disc 20 forming the cover D. The spring toothed disc 18 is preferably produced from phosphor-bronze or spring strip steel in a stamping and bending process and consequently ensures a constant spring force even over a long period of time and to the greatest possible extent independently of environmental influences.

The components of the spring force by which a recording medium 9 is held on the plate 12 and oriented with respect to the periphery 5 are determined by the angle at which the tooth 21 of the spring tooth disc 18 bears on the balls 6. As a result, a force component provided for centring the recording medium 9 on the disc turntable and a holding force which presses a recording medium 9 onto the disc turntable are advantageously configured differently.

The cover D forming the holding and removing device projects above balls 6 provided as holding means with a restoring means R in such a way that they are guided back as a result of the pressing of the cover D into the interior of the pot-shaped hub and a holding force exerted on the recording medium 9 is reduced. The recording medium 9 is thereby emplaced on the disc turntable or removed from the disc turntable with a force which is smaller than a holding force exerted on the recording medium 9 by holding means. As a result, with the holding and removing device, it is advantageously possible to produce recording and reproduction apparatuses for disc-type recording media 9 which record on or play the recording medium 9 with an increased rotational speed yet nonetheless holds the recording medium 9 with means provided exclusively on the disc turntable.

Figure 7:
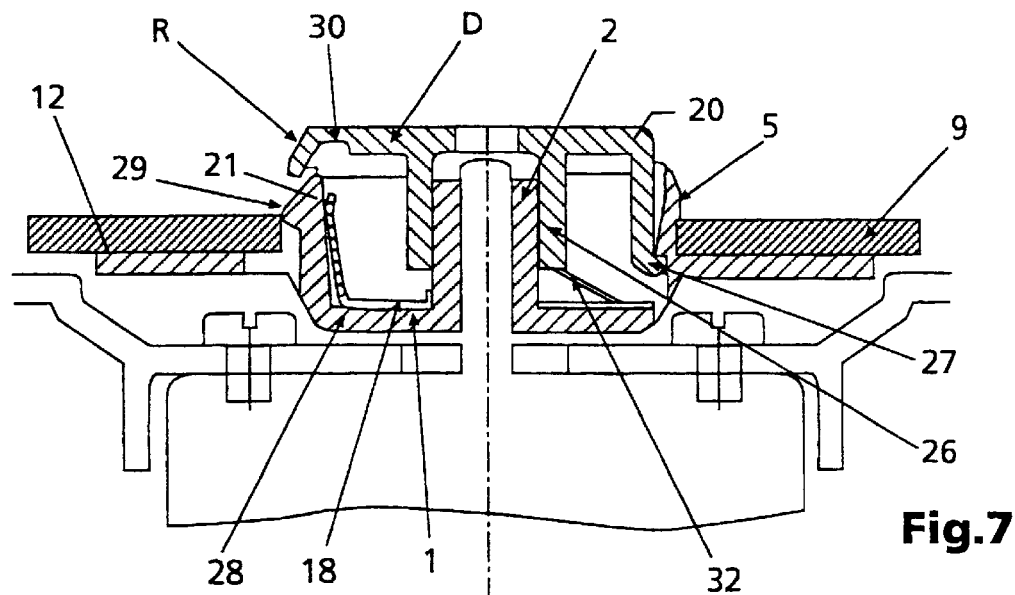
FIG. 7: shows a schematic sketch of a second embodiment according to the invention in section on line III—III in FIG. 8, and FIG. 8: shows a schematic sketch of the second embodiment according to the invention in plan view.
Figure 8:
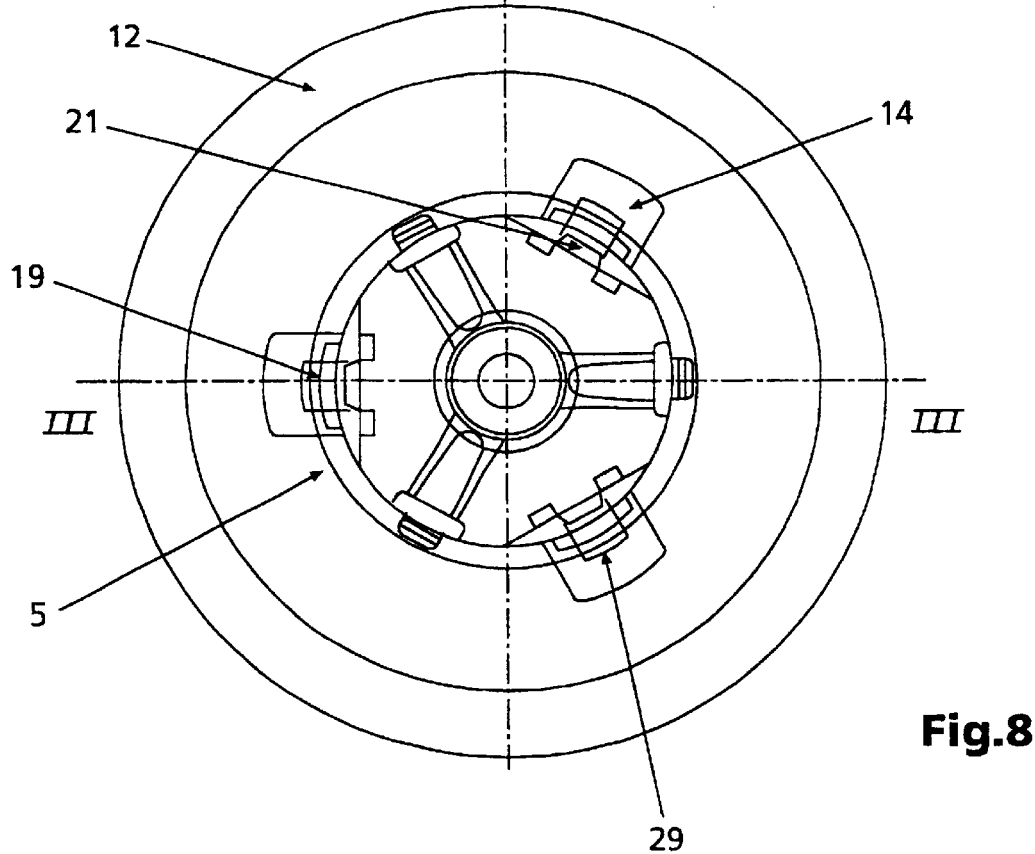

A second embodiment according to the invention is illustrated in FIGS. 7 and 8. It comprises a plastic body 28 having pot-type springs 19. In accordance with this embodiment, the pot-type springs 19, which can even form a spring element independently, are additionally supported by the spring toothed disc 18 already mentioned above. As illustrated in FIG. 8, the pot-type springs 19 and the teeth 21 of the spring toothed disc 18 are likewise preferably arranged with an angular spacing of 120 degrees in each case at the periphery 5 of the hub of the disc turntable, the said hub penetrating through a centering hole 11 in the recording medium 9. Slots 14 are provided at the periphery 5 (illustrated in FIG. 8) of the hub of the disc turntable, between which slots, are illustrated in FIG. 7, are arranged pot-type springs 19 proceeding from the bottom of the pot-shaped plastic body 28. At their ends, the pot-type springs 19 each carry an outwardly directed lug 29, which preferably has a different inclination in the direction to and from the plate 12 which receives the recording medium 9. The very fact that the lug 29 has the different inclination in the direction to and from the disc turntable means that a force required for the emplacement of the recording medium 9 is smaller than a holding force which holds a recording medium 9 on the disc turntable. During the emplacement of the recording medium 9, the tongue-shaped pot-type springs 19 initially spring back and then settle with the lug 29 on the recording medium 9. The recording medium 9 consequently latches into place on the disc turntable in a manner allowing it to be removed and is furthermore centered by the lugs 29.

However, if the recording medium 9 is intended to be recorded on or played with an increased rotational speed and held with means that are provided exclusively on the disc turntable, an increased holding force is necessary and overcoming this during the emplacement or removal of the recording medium 9 disadvantageously results in mechanical loading on the recording medium 9. In order to reduce the holding force, therefore, a holding and removing device is also provided in the case of holding means that are formed by pot-type springs 19, which holding and removing device is advantageously formed by a cover D which closes off the pot-shaped hub of the disc turntable.

The lugs 29 of the pot-type springs 19 both hold the recording medium 9 on the disc turntable and center it with respect to the periphery 5 of the hub. Tolerances of the centering hole 11 in the recording medium 9 are compensated for.

Consequently, the plastic body 28 with pot-type springs 19 having lugs 29 is suitable as an advantageous mount for disc-type recording media 9 in recording or reproduction apparatuses, since it has a smaller number of individual parts. The disc turntable and holding means can advantageously be embodied in one piece. A tolerance chain which always occurs when there are a plurality of individual parts is reduced by the one-piece embodiment. Disc turntables are provided which are produced in one piece despite the pot-shaped hub. In contrast to the disc turntable with pot-shaped hub as illustrated in FIG. 2, the bearing surface for the recording medium 9, the centering hub for the recording medium 9 and the bush 2 for receiving the drive spindle of the disc turntable are integrated in one part, thereby reducing the tolerance chain. The cover D according to the invention is then advantageously combined with a disc turntable produced in one piece.

A further advantage of the exemplary embodiments according to the invention resides in the small structural height, which cannot be achieved, in principle, with a known one-piece disc turntable in accordance with FIG. 4, since the tongue-shaped springs 15 proceed from the head of the hub and are formed by undercut ends. The pot-type springs 19 can, in principle, be realized with a smaller structural height and the cover D requires only a comparatively small structural height.

In order to further improve the spring, holding and centring properties, the spring toothed disc 18 already mentioned is additionally provided in the pot-shaped plastic body 28. In this case, the configuration and arrangement of the spring toothed disc 18 are identical to the first embodiment according to the invention in essential parts, apart from the fastening in the bottom of the pot-shaped hub.

The pot-type springs 19 likewise have pockets which are directed towards the center point of the disc turntable and into which teeth 21 of the spring toothed disc 18 engage. The teeth 21 of the spring toothed disc 18 each bear on the inner wall of the pot-type spring 19 at an acute angle on the rear side of the lug 29 and thereby support the spring force proceeding from the pot-type spring 19.

Cutouts 30 are provided in a latching disc 20, which forms the cover D of the pot-shaped plastic body 28 and is anchored with one or more latching webs 27 laterally in the pot-shaped plastic body 28, into which cutouts engages an end of the pot-type spring 19 which carries the lug 29. With the cutout 30 also forming a stop for the pot-type spring 19, a pot-type spring 19 which is under prestress is advantageously formed. For this purpose, the elastic pot-type springs 19 of the plastic body 28 are produced at an angle to the bottom of the pot-shaped plastic body 28 which exceeds 90 degrees, and, during the mounting of the latching disc 20 which forms the cover D, are forced back until they latch into the cutouts 30 thereof. With the prestress, a large spring force of the pot-type springs 19 is advantageously achieved in spite of small spring excursions, which spring force, for a number of applications, is already large enough to hold and to center the recording medium 9 on the disc turntable even without the support by the spring toothed disc 18. In the case of the embodiment illustrated in FIGS. 7 and 8, it is possible to use either already prestressed pot-type springs 19 or else pot-type springs 19 which have no prestress, since a prestress can be generated by the spring toothed disc. The advantage of a prestress that has not already been effected by the angle during the production of the pot-type springs 19 resides in the fact that embodiments of this type exhibit smaller variations in the spring force, since prestressed plastics generally exhibit greater fatigue phenomena then, by way of example, a spring produced from phosphor-bronze or spring strip steel.

With the cutout 30 which also forms a stop for the pot-type springs 19 and is formed with the restoring means R provided on the edge of the cover D, it becomes possible, on the one hand, for the cover D to be movable in the direction of the disc turntable and, on the other hand, the effect achieved by the inclination of the lugs 29 is that the cover D is held in a position which is limited by lateral anchoring of the latching webs 27 in the pot-shaped plastic body 28.

With the restoring means Rand cutouts 30 which are provided in the cover D and in which the ends of the pot-type springs 19 engage, the pot-type springs 19 are guided back into the interior of the pot-shaped hub as a result of the pressing of the cover D in the direction of the disc turntable and a holding force proceeding from the pot-type springs 19 is thereby reduced. In the case of embodiments which are a spring toothed disc 18 to support or apply the spring force, the restoring of the cover D into its starting position can be supported by a spring web 32, which is provided on the spring toothed disc 18 and resiliently supports a holding-down device 26 by means of which the spring toothed disc 18 is also advantageously held on the bottom of the pot-shaped hub. It is then not necessary to fixedly anchor the spring toothed disc 18 in the bottom of the pot-shaped hub.

The loading on the recording medium during emplacement or removal is advantageously reduced and, by virtue of the special configuration of the cover as restoring means, no additional individual parts are necessary.

What is claimed is:

1. Recording or reproduction apparatus with a holding and removing device for disc-type recording media, comprising:

holding means provided on a hub of a disc turntable to emplace the recording medium on the disc turntable or to remove the recording medium from the disc turntable with a force which is smaller than a holding force exerted on the recording medium, the holding means including balls or lugs for holding said recording medium on the disc turntable that are pressed outwards by a spring force of the teeth of a spring toothed disc which is arranged in the hub of the disc turntable; and a cover of the hub of the disc turntable projecting above said holding means with a restoring means and wherein said cover projects above and engages over the balls or lugs so that pressing of the cover in a direction directed at the disc turntable has the result that the balls or lugs are guided back thereby reducing the holding force exerted on the recording medium.

2. Recording or reproduction apparatus according to claim 1, wherein the cover comprises a latching disc.

3. Recording or reproduction apparatus according to claim 1, wherein the restoring means is formed by an edge of the cover of the hub of the disc turntable, the restoring means reducing the degree to which the recording medium is retained when the cover is pressed in the direction of the disc turntable.

4. Recording or reproduction apparatus according to claim 3, wherein the holding means are arranged in a spring-elastic manner with a spring toothed disc in the hub of the disc turntable, which hub is adapted to penetrate through a centering hole in the recording medium.

5. Recording or reproduction apparatus according to claim 1, wherein a web supported on a spring web of a spring toothed disc is provided on the cover.

6. Recording or reproduction apparatus according to claim 1, wherein the cover can be moved in the direction of the disc turntable and, with a force applied by the holding means, is forced away from the disc turntable as far as a position limited by at least one latching web which engages laterally in the pot-shaped hub.

7. Recording or reproduction apparatus according to claim 1, wherein the spring toothed disc provided in the hub of the disc turntable is held on the bottom of the hub of the disc turntable by a web provided on the cover.

8. Recording or reproduction apparatus with a holding and removing device for disc-type recording media, comprising:

holding means provided on a hub of a disc turntable to emplace the recording medium on the disc turntable or to remove the recording medium from the disc turntable with a force which is smaller than a holding force exerted on the recording medium, the holding means including balls or lugs for holding said recording medium on the disc turntable that are pressed outwards by a spring force of the teeth of a spring toothed disc which is arranged in the hub of the disc turntable providing a force component for centering the recording medium on the disc turntable differently to a holding force, which presses the recording medium on the disc turntable and a cover of the hub of the disc turntable projecting above said holding means with a restoring means and wherein said cover projects above and engages over the balls or lugs so that pressing of the cover in a direction directed at the disc turntable has the result that the balls or lugs are guided back thereby reducing the holding force exerted on the recording medium.

9. Recording or reproduction apparatus according to claim 8, wherein the components of the spring force by which the recording medium is held on the disc turntable are determined by an angle at which the tooth of the spring toothed disc bears on the balls or lugs.

* * * * *